US005508497A

United States Patent [19]

Fabianowski et al.

[11] Patent Number: 5,508,497
[45] Date of Patent: Apr. 16, 1996

[54] METHOD FOR OPEN-LOOP/CLOSED-LOOP CONTROL OF AT LEAST TWO PARALLEL OSCILLATING CIRCUIT INVERTERS FEEDING INDUCTION FURNACES

[75] Inventors: Jan Fabianowski, Dortmund; Robert Ibach, Schwerte, both of Germany

[73] Assignee: ABB Patent GmbH, Mannheim, Germany

[21] Appl. No.: 252,236

[22] Filed: Jun. 1, 1994

[30] Foreign Application Priority Data

Feb. 2, 1994 [DE] Germany ............. 44 03 078.9

[51] Int. Cl.⁶ ................................. H05B 6/08
[52] U.S. Cl. .............. 219/663; 219/666; 219/662; 363/71; 373/148
[58] Field of Search ................. 219/663, 665, 219/666, 662, 671; 373/147, 148; 363/71, 72; 307/82, 39

[56] References Cited

U.S. PATENT DOCUMENTS

| 4,280,038 | 7/1981 | Havas et al. ............. 219/666 |
| 4,289,946 | 9/1981 | Yarwood et al. ......... 219/665 |
| 4,507,722 | 3/1985 | Dewan et al. ............ 363/79 |
| 4,556,937 | 12/1984 | Ziogas et al. ............ 363/71 |
| 5,266,765 | 11/1993 | Storm et al. ............. 219/663 |

FOREIGN PATENT DOCUMENTS 0562471  9/1993  European Pat. Off. .
3710085  10/1988  Germany .

OTHER PUBLICATIONS

EPE Publ. Oct. 1989, pp. 353–360 "A New Sequential–Switching Voltage–Clamped High–Frequency Resonant . . . ".

*Primary Examiner*—Philip H. Leung
*Attorney, Agent, or Firm*—Herbert L. Lerner; Laurence A. Greenberg

[57] ABSTRACT

In a method for open-loop/closed-loop control of current converter valves of at least two load-guided parallel oscillating circuit inverters being supplied from a common direct current or direct voltage source and being connected in series on the DC side, each inverter has one induction furnace with a compensating conductor. Two diagonally opposed current converter valves are ignited at a time in one inverter to establish a flow of current from the source with a series-connected choke through the parallel oscillating circuit connected to that inverter. Load phase angles of the parallel oscillating circuit inverters are adjusted, resulting in arbitrarily specified individual powers of the parallel oscillating circuits wherein a maximum power that can be output by the source is taken into account, and attaining a specified ratio between the individual powers of the parallel oscillating circuits. An intervention is made into the open-loop/closed-loop control of the source only after one of the load phase angles to be established reaches a minimum value being dictating in particular by valve hold-off intervals, for reducing the direct current or direct voltage, while operating the source in fully driven fashion at load phase angles to be established above the minimum value.

2 Claims, 4 Drawing Sheets

5,508,497

METHOD FOR OPEN-LOOP/CLOSED-LOOP CONTROL OF AT LEAST TWO PARALLEL OSCILLATING CIRCUIT INVERTERS FEEDING INDUCTION FURNACES

BACKGROUND OF THE INVENTION

Field of the Invention

The invention relates to a method for open-loop/closed-loop control of the current converter valves of at least two load-guided parallel oscillating circuit inverters being supplied from a common direct current or direct voltage source and connected in series on the DC side, each having one induction furnace with a compensating capacitor, wherein by ignition of two diagonally opposed current converter valves at a time in one inverter, a flow of current from the direct current source or direct voltage source with a series-connected choke is established through the parallel oscillating circuit connected to that inverter.

A parallel oscillating circuit inverter for inductive heating is known from Siemens-Zeitschrift [Siemens Journal] 45 (1971), No, 9, pp, 601–606. That involves an intermediate circuit frequency converter circuit with impressed current in the intermediate circuit, The direct current generated by the power rectifier from an alternating mains voltage is converted into a medium-frequency alternating current in the load-side inverter. The load includes an inductor that inductively transmits the operative power to the product (such as molten metal) to be heated. In order to cover the high reactive power demand, the inductor is expanded with the aid of one or more compensating capacitors to make a parallel oscillating circuit. In the load-guided inverter, the impressed intermediate circuit current is alternatingly switched to the load at the clock rate of the operating frequency, through diagonally opposed valve branches, and generates a virtually sinusoidal voltage in the load. The operating frequency that comes to be established depends directly on the natural frequency of the load circuit, because of the load clocking.

In a system including a plurality of induction furnaces, each with its own parallel oscillating circuit inverters, it is usual to connect each parallel oscillating circuit inverter to its own direct current source, or in other words its own rectifier, with a direct current intermediate circuit, which is very expensive.

SUMMARY OF THE INVENTION

It is accordingly an object of the invention to provide a method for open-loop/closed-loop control of the current inverter valves of two or more parallel oscillating circuit inverters supplied from a common DC source or a common direct voltage source (with a series-connected choke), wherein the parallel oscillating circuit inverters belong to two or more induction furnaces, which method overcomes the hereinafore-mentioned disadvantages of the heretofore-known methods of this general type, enables infinitely graduated adjustment of the power furnished by the DC source or direct voltage source and enables distribution to the various induction furnaces.

With the foregoing and other objects in view there is provided, in accordance with the invention, in a method for open-loop/closed-loop control of current converter valves of at least two load-guided parallel oscillating circuit inverters being supplied from a common direct current or direct voltage source source and being connected in series on the DC side, each inverter having one induction furnace with a compensating conductor, which includes igniting two diagonally opposed current converter valves at a time in one inverter to establish a flow of current from the source with a series-connected choke through the parallel oscillating circuit connected to that inverter, the improvement which comprises adjusting load phase angles of the parallel oscillating circuit inverters, resulting in arbitrarily specified individual powers of the parallel oscillating circuits wherein a maximum power that can be output by the source is taken into account, and attaining a specified ratio between the individual powers of the parallel oscillating circuits, and intervening into the open-loop/closed-loop control of the source only after one of the load phase angles to be established reaches a minimum value dictated in particular by valve hold-off intervals for reducing the direct current or direct voltage, while operating the source in fully driven fashion at load phase angles to be established above the minimum value.

In accordance with another mode of the invention, there is provided a method which comprises, when the supply is provided from a direct current source, determining a varied voltage of the direct current source as an auxiliary variable from a sum of varied powers to be established and from a constant current; ascertaining a varied impedance of each parallel oscillating circuit from the varied voltage and the varied oscillating circuit power to be established; and determining the load phase angles from the ascertained varied impedances.

In accordance with a concomitant mode of the invention, there is provided a method which comprises, when the supply is provided from a direct voltage source with a series-connected choke, determining a varied current as an auxiliary variable while taking both the varied powers to be established and the voltage into account; ascertaining a varied impedance of each parallel oscillating circuit from the varied oscillating circuit current and the varied oscillating circuit power to be established; and determining the load phase angles from the ascertained varied impedances.

It is assumed that each of the inverters with a load circuit is understood to be a resistor downstream of the intermediate circuit (DC intermediate circuit). The resistance of these resistors is varied by a suitable inverter control.

The advantages attainable with the invention are in particular that two or more parallel oscillating circuit inverters, each belonging to its own induction furnace, are supplied from a common DC source or direct voltage source with only one rectifier for converting an alternating mains voltage into a direct voltage. The instantaneously produced rectifier power is equivalent to the sum of all of the instantaneously used parallel oscillating circuit inverter powers. It is possible, for instance, for the installed rectifier power to be dimensioned in accordance with the installed power of a parallel oscillating circuit inverter. This has the advantage of providing major cost savings as compared with the conventional technology, in which each parallel oscillating circuit inverter requires its own rectifier with power adapted to the parallel oscillating circuit inverter. According to the invention, it is possible to adjust the instantaneously used parallel oscillating circuit inverter powers in an infinitely graduated way and independently of one another. The sum of all of the instantaneously required inverted powers naturally must not exceed the installed rectifier power. It is especially advantageous if the sum of all of the instantaneously used inverter powers during all of the different operating phases always amounts to 100% of the installed rectifier power, because the rectifier is then being utilized optimally.

In all of the inverters, a very wide power control range (1:100 and more) is possible.

Other features which are considered as characteristic for the invention are set forth in the appended claims.

Although the invention is illustrated and described herein as embodied in a method for open-loop/closed-loop control of at least two parallel oscillating circuit inventors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
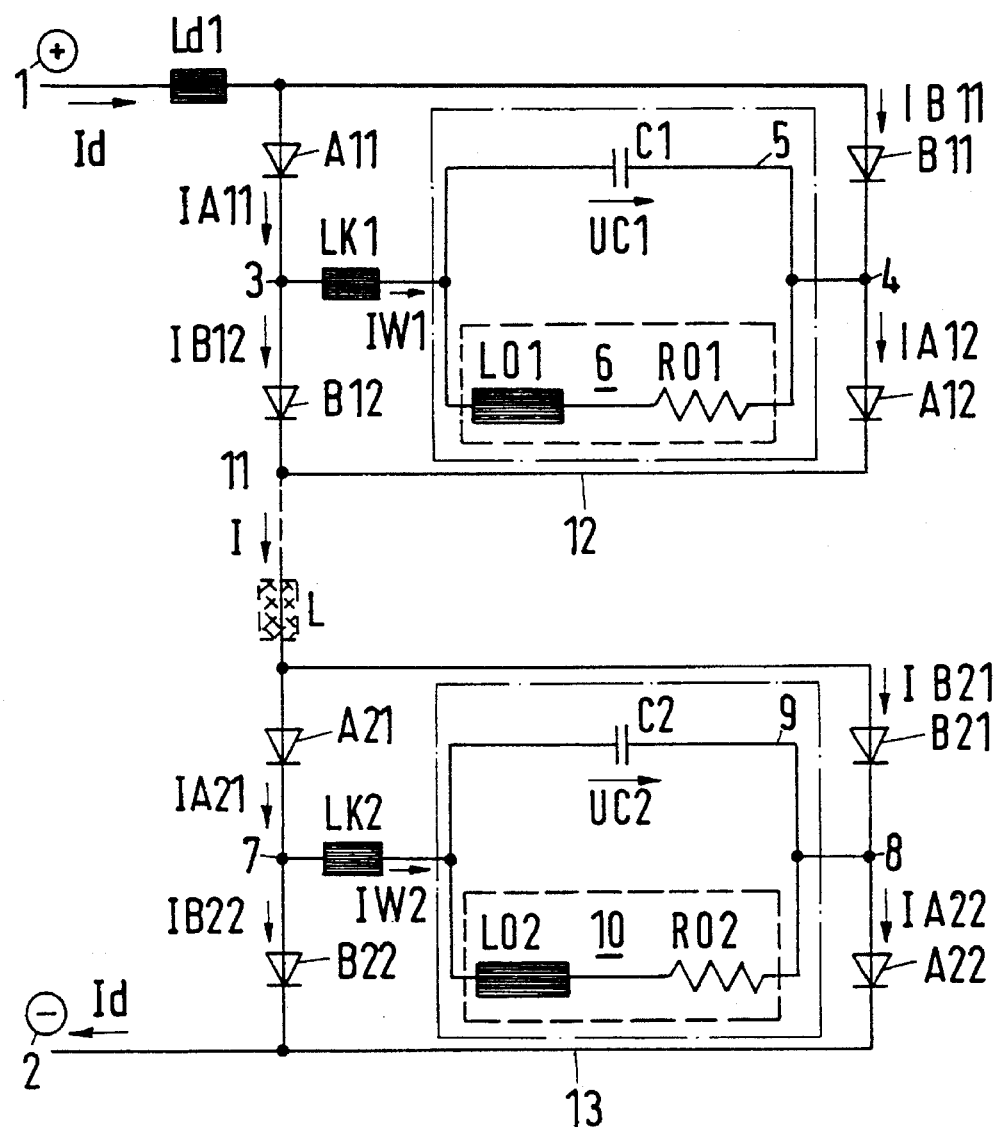
FIG. 1 is a schematic circuit diagram showing two parallel oscillator circuits of two induction furnaces, wherein each oscillator circuit is supplied by its own inverter.

Referring now to the figures of the drawing in detail and first, particularly, to FIG. 1 thereof, there are seen two parallel oscillating circuits of two induction furnaces, wherein each oscillating circuit is supplied by its own inverter. A first inverter 12, including four current converter valves A11, A12, B11, B12 can be seen. Anodes of the valves A11 and B11 are connected to a positive pole 1 through a smoothing choke Ld1, and cathodes of the valves B12 and A12 are located at a junction 11 of the two inverters. The junction 11 is at the same time a negative pole for the first inverter 12. A junction of a cathode of the valve A11 and an anode of the valve B12 forms a first load terminal 3, and a junction of a cathode of the valve B11 and an anode of the valve A12 forms a second load terminal 4 of the first inverter 12.

A first parallel oscillating circuit 5 is connected between the two load terminals 3, 4, and an inductive commutating resistor LK1 is disposed between the load terminal 3 and the parallel oscillating circuit 5. The parallel oscillating circuit 5 includes a coil 6 of a first induction furnace and a parallel-connected first capacitor C1 (compensating capacitor). The coil 6 has an inductive resistor L01 and an ohmic resistor R01.

A second inverter 13 is disposed between the junction 11 and a negative pole 2 of a DC source or direct voltage source. The positive pole 1 and the negative pole 2 are preferably supplied from a three-phase power grid, or mains, through a rectifier. The second inverter 13 has four current converter valves A21, A22, B21, B22 and two load terminals 7, 8. The second inverter 13 supplies a second parallel oscillating circuit 9 which is located between the two load terminals 7, 8 and has a coil 10 (with an inductive resistor L02 and resistor R02) and a second capacitor C2. An inductive commutating resistor LK2 is connected between the load terminal 7 and the parallel oscillating circuit 9.

An input current supplied to the two inverters 12, 13, or in other words the current being supplied from the DC or direct voltage source and flowing through the smoothing choke Ld1, is indicated by reference symbol Id. Current flows across the valves A11, A12, B11, B12 on one hand and A21, A22, B21, B22 on the other hand are indicated as IA11, IA12, IB11, IB12 and IA21, IA22, IB21, IB22, respectively. An output current of the first inverter 12, that is a flow of current across the inductive commutating resistor LK1 and the parallel oscillating circuit 5, is indicated by reference symbol IW1. A voltage at the first capacitor C1 is indicated by reference symbol UC1. An output current of the second inverter 13 is indicated by reference symbol IW2, and a voltage at the second capacitor C2 is indicated by reference symbol UC2.

Figure 2:
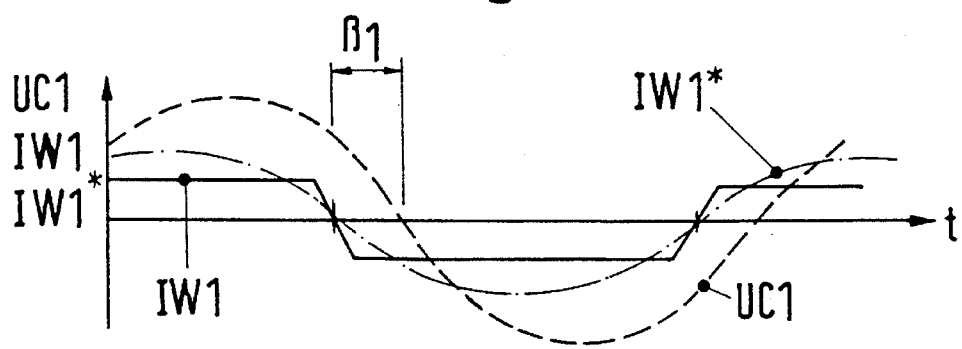
FIG. 2 is a graph of a course over time of a voltage at a capacitor of an oscillating circuit and of a current along the oscillating circuit.

FIG. 2 shows a course over time of the voltage at the capacitor of an oscillating circuit and of the current along this oscillating circuit. The voltage UC1 and the current IW1, which is in the load with respect to the voltage, can be seen. Reference symbol IW1* indicates a first harmonic of this current. A period of time between the zero crossover of the voltage UC1 and a zero crossover of the current IW1* corresponds to a load phase angle β1 of the first parallel oscillating circuit inverter 12. For information on the mode of operation of the parallel oscillating circuit inverter, reference may be made to German Published, Non-Prosecuted Application DE 30 23 697 A1 and to the publication Siemens-Zeitschrift [Siemens Journal] 45 (1971), No. 9, pp. 601–606.

In principle, the natural frequencies of the two oscillating circuits may differ. In other words, the frequency of the voltage UC2 is independent of the frequency of the voltage UC1. This is understandable, since the frequencies of the voltages UC1, UC2 depend on the capacitances of the capacitors C1, C2 and the resistances of the resistors R01, R02 and the inductances of the resistors L01, L02 of the induction furnaces (the filling of the furnace, among other factors, influences the frequency). Triggering of the valves of the inverters is carried out while taking these frequencies into account, and peripheral conditions, such as adequately high voltage at the capacitors of the parallel oscillating circuits and valve hold-off intervals should be taken into account as well.

Figure 3:
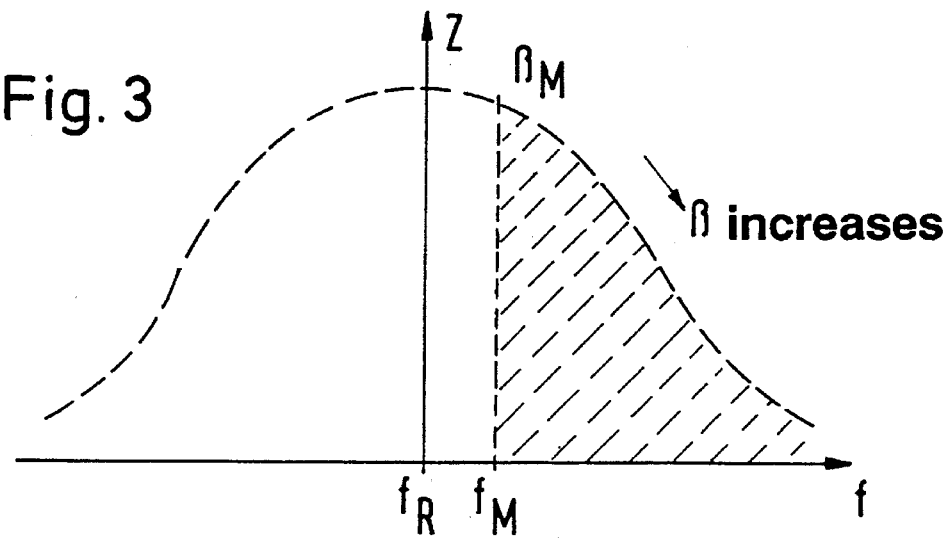
FIG. 3 is a graph of a relationship between an impedance of an oscillating circuit and an oscillating circuit frequency.

FIG. 3 illustrates a relationship between the impedance of an oscillating circuit and the frequency of the oscillating circuit. The impedance curve shown expresses the following equation:

$$Z = \frac{\frac{1}{j\omega c}(R + j\omega L)}{R + j\omega L + \frac{1}{j\omega c}} = \underbrace{\frac{R}{\omega^2 LC + \omega RC + 1}}_{Re(Z)} + \underbrace{\frac{\omega L}{\omega^2 LC + \omega RC + 1}}_{IM(Z)}$$

where:

$\omega = 2\pi f$,

Z=impedance of the oscillating circuit, $\omega$=circuit frequency, f=frequency of the oscillating circuit, C=C1, C2, etc., L=L01, L02, etc., R=R01, R02, etc., Re(Z)=the real portion of Z, and Im(Z)=the imaginary portion of Z.

In FIG. 3, a symbol $f_R$ indicates a resonant frequency of the oscillating circuit, while a symbol $f_M$ is a minimum value of the frequency, which results upon adjustment of the minimum value $\beta_M$ of the load phase angle $\beta$. When the minimal value $\beta_M$ is defined, the necessary hold-off interval of the current converter valves must be considered. The oscillating circuit frequency is always higher than the resonant frequency. Adjustment of the load phase angle $\beta \geq \beta_M$, or of the corresponding ignition pulses, is performed in the range of the impedance curve which is shown shaded (operating range). As can be seen, the frequency f rises as the load phase angle $\beta$ increases, while the impedance Z decreases at the same time.

Figure 4:
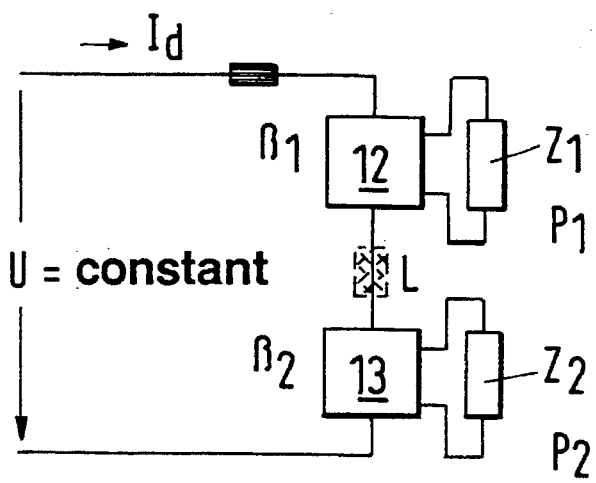
FIG. 4 is a basic schematic and block circuit diagram showing an ignition angle adjustment when the inverter is supplied from a direct voltage source.

FIG. 4 shows a basic diagram of an ignition angle adjustment when the inverter is supplied from a direct voltage source with a series-connected choke. The assumption is a state with a load phase angle $\beta_1$ of the first inverter 12 and a load phase angle $\beta_2$ of the second inverter 13. According to the impedance curve of FIG. 3, impedances of $Z_1$ and $Z_2$ prevail at these respective load phase angles $\beta_1$ and $\beta_2$. The total impedance Z is $Z_1+Z_2$. For the direct current $I_d$ resulting at a constant voltage U, the equation that applies is $I_d=U/\mathrm{Re}(Z_1+Z_2)$. The power of the first oscillating circuit is $P_1=I_d^2 \cdot \mathrm{Re}(Z_1)$, and the power of the second oscillating circuit is $P_2=I_d^2 \cdot \mathrm{Re}(Z_2)$.

The operator of the induction furnaces would like to specify a varied power $P_1'$ for the first oscillating circuit and $P_2'$ for the second oscillating circuit. Naturally, the total power $P_1'+P_2'$ must not exceed the maximum power of the direct voltage source. A varied current flow $I_d'$ is obtained from the equation $I_d'=(P_1'+P_2')/U$. A varied impedance $Z_1'$ to be established follows from the equation $\mathrm{Re}(Z_1)'=P_1'/I_d'^2$, and a varied impedance $Z_2'$ to be established follows from the equation $\mathrm{Re}(Z_2)'=P_2'/I_d'^2$. According to the impedance curve of FIG. 3, the load phase angles $\beta_1'$ and $\beta_2'$ to be established result in accordance with the impedances $Z_1'$ and $Z_2'$. During operation, the direct voltage source remains fully driven as much as possible in order to establish the varied powers $P_1'$, $P_2'$. However, if one of the load phase angles to be newly established reaches the minimum value $\beta_M$ and the current $I_d$ is still too high, then the voltage U must be reduced by intervention into the open-loop/closed-loop control of the direct voltage source (power rectifier), in order to reduce the power of the direct voltage source.

Figure 5:
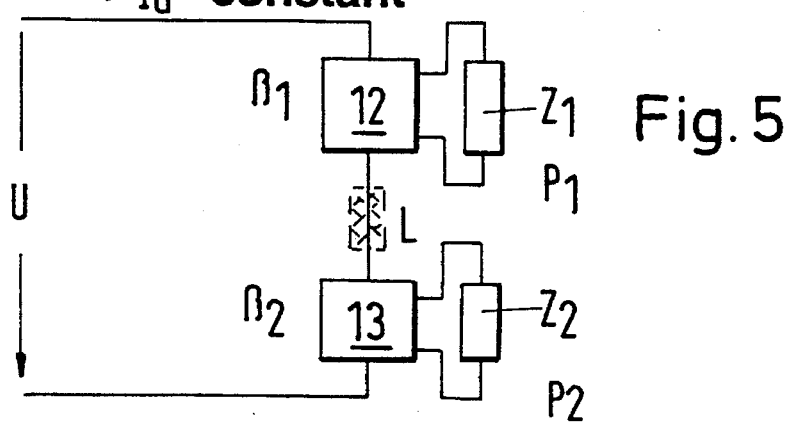
FIG. 5 is a view similar to FIG. 4 showing an ignition angle adjustment when the inverter is supplied from a direct current source.

FIG. 5 shows a basic diagram of an ignition angle adjustment when the inverter is supplied from a direct current source. The assumption is a state with a load phase angle $\beta_1$ of the first inverter 12 and a load phase angle $\beta_2$ of the second inverter 13. According to the impedance curve of FIG. 3, impedances of $Z_1$ and $Z_2$ prevail at these respective load phase angles $\beta_1$ and $\beta_2$. The total impedance Z is $Z_1+Z_2$. For the voltage resulting at a constant current $I_d$, the equation that applies is $U=\mathrm{Re}(Z_1+Z_2) \cdot I_d$. The power of the first oscillating circuit is $P_1=U^2/\mathrm{Re}(Z_1)$, and the power of the second oscillating circuit is $P_2=U_d^2/\mathrm{Re}(Z_2)$.

The operator of the induction furnaces would like to specify a varied power $P_1'$ for the first oscillating circuit and $P_2'$ for the second oscillating circuit. Naturally, the total power $P_1'+P_2'$ must not exceed the maximum power of the direct voltage source. A varied voltage is obtained from the equation $U'=(P_1'+P_2')/I_d$. A varied impedance $Z_1'$ to be established follows from the equation $\mathrm{Re}(Z_1)'=U'^2/P_1'$, and a varied impedance $Z_2'$ to be established follows from the equation $\mathrm{Re}(Z_2)'=U^2P_2'$. According to the impedance curve of FIG. 3, the load phase angles $\beta_1'$ and $\beta_2'$ to be established result in accordance with the impedances $Z_1'$ and $Z_2'$. During operation, the direct current source remains fully driven as much as possible in order to establish the varied powers $P_1'$, $P_2'$. However if one of the load phase angles to be newly established reaches the minimum value $\beta_M$ and the voltage U' is still too high, then the current $I_d$ must be reduced by intervention into the open-loop/closed-loop control of the direct current source (power rectifier), in order to reduce the power of the direct current source.

In principle, the powers delivered to the first and second induction furnaces can be adjusted independently of one another and in an infinitely graduated fashion. For instance, the first induction furnace can be operated at 80% of its rated power, and the second induction furnace can be operated at 50% of its rated power. However, it is especially advantageous if the total power for induction furnaces of the same rated power is 100% or less in all operating cases. In other words, the first induction furnace is operated at 10% of its rated power, for instance, and the second induction furnace is at the same time operated at 90% of its rated power. In this kind of alternative mode of operation of two induction furnaces, the direct current source (for instance, a rectifier with a DC intermediate circuit) or the direct voltage source with a series-connected choke needs to be constructed for only 100% of the power of a parallel oscillating circuit inverter, yet two induction furnaces each with 90% power, for instance, can be supplied in alternation, with one furnace in smelting operation, for instance, operating at 90% power and the other furnace simultaneously at 10% power for a holding mode. It is naturally possible for both induction furnaces to be simultaneously run at 10% for the holding mode. To that end, the power to be output by the DC or direct voltage source can be lowered, for instance by correspondingly varying the valves of the power rectifier.

The above discussions relate to a configuration with two parallel oscillating circuit inverters. However, as was already noted, additional parallel oscillating circuit inverters may also be present, that is systems with two, three and more parallel oscillating circuit inverters can be used, and the parallel oscillating circuit inverters can be connected in series on the DC side. Triggering of the various parallel oscillating circuit inverters is suitably performed in a mutually adapted manner, in such a way that the DC source or direct voltage source preferably produces 100% power, and this power is distributed in the desired way to the various parallel oscillating circuit inverters. In this kind of operation with a fully driven power rectifier, it is assured that the DC or direct voltage source will make a minimum reactive power demand and impose a minimum harmonics spectrum on a preceding three-phase current system.

Figure 6:
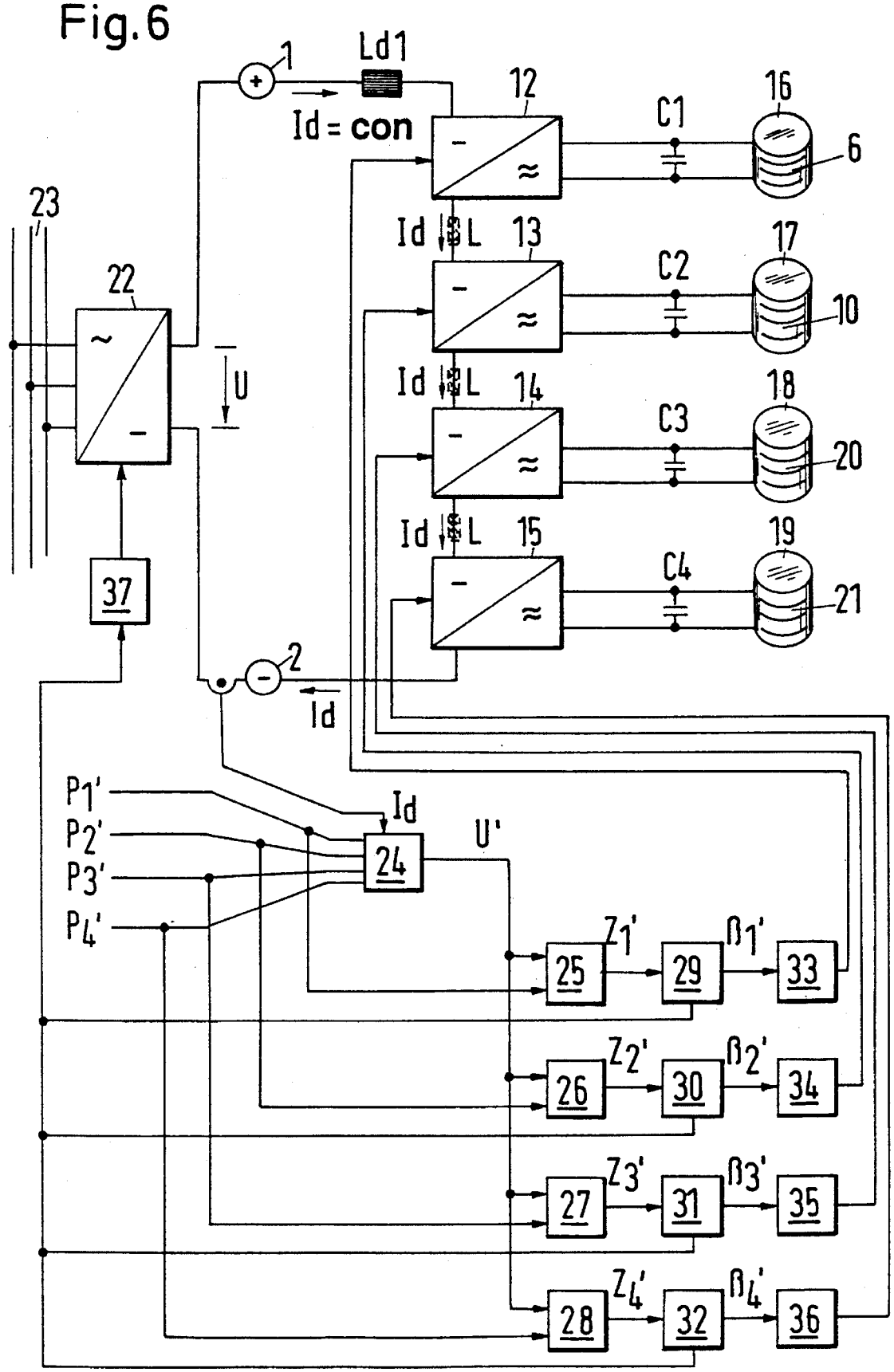
FIG. 6 is a schematic and block circuit diagram of a system having four parallel oscillating circuit inverters being supplied from a DC source, and a control unit for power adjustment and power distribution.

In FIG. 6, a system with four parallel oscillating circuit inverters supplied by a DC source, and a control unit for power adjustment and power distribution, are shown. Four parallel oscillating circuit inverters 12, 13, 14, 15 can be seen, which are connected in series on the DC side between the positive pole 1 and the negative pole 2 of the DC source. A rectifier 22 connected to a three-phase current grid 23 and the smoothing choke Ld1, serve as the DC source. The coils 6, 10 as well as coils 20, 21 and the capacitors C1, C2 as well as capacitors C3, C4 of the parallel oscillating circuits are associated with respective inductive furnaces 16, 17, 18, 19. At a rated power of 100% per parallel oscillating circuit inverter 12–15, the DC source is preferably constructed for 200% of this power For instance, two induction furnaces can then be optimally operated simultaneously at 90% rated power each (smelting mode), and two induction furnaces can each be optimally operated at 10% rated power (holding mode).

The control unit (which, for instance, is digital) has a computational element 24 with an input side to which the powers $P_1'$, $P_2'$, $P_3'$, $P_4'$ to be established and the direct current Id are supplied, and the computational element 24 calculates from these variables the requisite voltage U', as an auxiliary variable, that is necessary for the total power to be established at a constant current $I_d$: $U'=(P_1'+P_2'+P_3'+P_4')/I_d$. The computational element 24 optionally limits the power to be established to the maximum value of the DC source, in the event that the sum $P_1'+P_2'+P_3'+P_4'$ should exceed that maximum value.

A computational element 25 ascertains the impedance $Z_1'$ from the power $P_1'$ and the voltage U'. In the same way, a computational element 26 ascertains the impedance $Z_2'$ from the power $P_2'$ and the voltage U', a computational element 27 ascertains the impedance $Z_3'$ from the power $P_3'$ and the voltage U', and a computational element 28 ascertains the impedance $Z_4'$ from the power $P_4'$ and the voltage U'. The impedances $Z_1'$–$Z_4'$ ascertained by the computational elements 25–28 are carried to storage members 29–32. The impedance curve of FIG. 3 is stored in these storage elements, so that the respective load phase angles β' to be established can be ascertained from the impedances Z'. In this way, the storage element 29 ascertains the load phase angle $β_1'$ from the impedance $Z_1'$, the storage element 30 ascertains the load phase angle $β_2'$ from the impedance $Z_2'$, the storage element 31 ascertains the load phase angle $β_3'$ from the impedance $Z_3'$, and the storage element 32 ascertains the load phase angle $β_4'$ from the impedance $Z_4'$.

Ignition pulse shapers 33, 34, 35, 36 generate ignition pulses, corresponding to the ascertained load phase angles $β_1'$, $β_2'$, $β_3'$, $β_4'$, for the valves of the parallel oscillating circuit inverters 12, 13, 14, 15.

Figure 7:
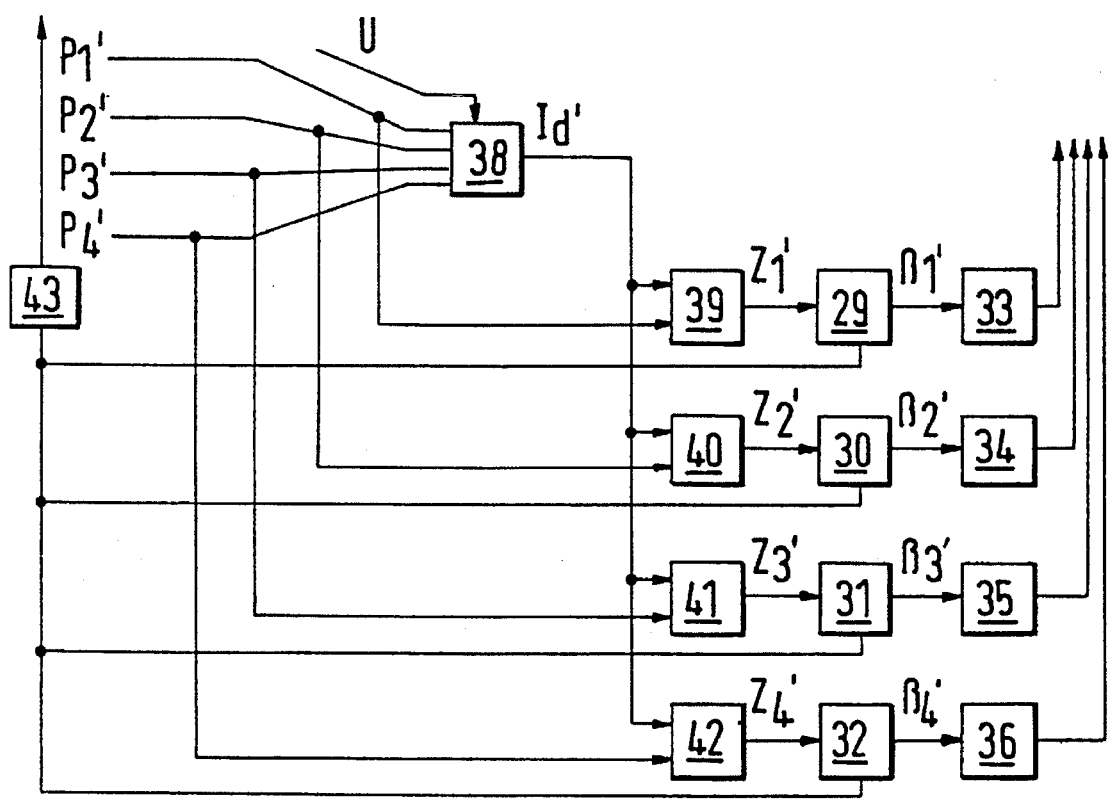
FIG. 7 is a view similar to FIG. 6 of a system with a supply from a direct voltage source.

If none of the ascertained load phase angles $β_1'$, $β_2'$, $β_3'$, $β_4'$ drops below or reaches the minimum value $β_M$, then no intervention into the open-loop/closed-loop control of the fully driven power rectifier 22 is made. However, if one of the load phase angles $β_1'$, $β_2'$, $β_3'$, $β_4'$ should reach this value $β_M$, then the affected storage element 29, 30, 31, 32 outputs a corresponding signal to a closed/open-loop control unit 37 of the rectifier 22, so that the current $I_d$ is reduced in order to bring about a power reduction. The reduction of the current $I_d$ is carried out in such a way that the affected inverter can be operated with a load phase angle that is slightly above the valve $β_M$. The voltage U', the impedances $Z_1'$, $Z_2'$, $Z_3'$, $Z_4'$ and the load phase angles $β_1'$, $β_2'$, $β_3'$, $β_4'$ result in accordance with the reduced current FIG. 7 shows a system with a control unit as in FIG. 6, but unlike that system, the supply is from a direct voltage source with a series-connected choke. The control unit (for instance a digital one) is changed as follows:

A computational element 38 ascertains the requisite varied current $I_d'$ at the total power to be established, from the varied powers $P_1'$, $P_2'$, $P_3'$, $P_4'$ to be established and from the direct voltage U as an auxiliary variable.

A computational element 39 determines the impedance $Z_1'$ from the power $P_1'$ and the current $I_d'$. Similarly, a computational element 40 determines the impedance $Z_2'$ from $P_2'$ and the current $I_d'$; a computational element 41 determines the impedance $Z_3'$ from the power $P_3'$ and the current $I_d'$; and a computational element 42 determines the impedance $Z_4'$ from the power $P_4'$ and the current $I_d'$.

The determination of the load phase angles $β_1'$, $β_2'$, $β_3'$ and $β_4'$ to be established from the impedances $Z_1'$, $Z_2'$, $Z_3'$ and $Z_4'$ by means of the storage elements 29, 30, 31, 32 and the generation of the corresponding ignition pulses for the valves of the parallel oscillating circuit inverters by means of the ignition pulse shapers 33, 34, 35, 36 are carried out as described for FIG. 6. In the same way, a closed/open-loop control unit 43 of the direct voltage source is varied only whenever one of the load phase angles $β_1'$, $β_2'$, $β_3'$, $β_4'$ reaches the value $β_M$, in order to lower the voltage U and thus produce a reduction in the current $I_d$. The reduction of the current $I_d$ is performed in such a way that the rectifier is reverse-controlled (reduction of its output voltage). The current $I_d'$, the impedances $Z_1'$, $Z_2'$, $Z_3'$, $Z_3'$ and the load phase angles $β_1'$, $β_2'$, $β_3'$, $β_4'$ result in accordance with the reduced voltage.

Boxes shown in broken lines in FIGS. 1, 4, 5 and 6 in each case indicate that chokes L are disposed between the various parallel oscillating circuit inverters for decoupling purposes.

We claim:

1. In a method of open-loop/closed-loop control of current converter valves of at least two load-guided parallel oscillating circuit inverters being supplied from a common source which is controlled by an open-loop/closed-loop control and being connected in series on the DC side, each inverter having one induction furnace with a compensating capacitor, which includes igniting two diagonally opposed current converter valves at a time in one inverter to establish a flow of current from the source with a series-connected choke through the parallel oscillating circuit connected to that inverter, the improvement which comprises:

adjusting load phase angles of the parallel oscillating circuit inverters, resulting in specified individual powers of the parallel oscillating circuits wherein a maximum power that can be output by the source is taken into account, and attaining a specified ratio between the individual powers of the parallel oscillating circuits, and intervening into the open-loop/closed-loop control of the source only after one of the load phase angles to be established reaches a minimum value defined with valve hold-off intervals, while operating the source in fully driven fashion at load phase angles to be established above the minimum value;

supplying the inverters from a direct current source, and reducing the direct current when intervening into the open-loop/closed-loop control and determining a varied voltage of the direct current source as an auxiliary variable from a sum of varied powers to be established and from a constant current; ascertaining a varied impedance of each parallel oscillating circuit from the varied voltage and the varied oscillating circuit power to be established; and determining the load phase angles from the ascertained varied impedances.

2. In a method Of open-loop/closed-loop control of current converter valves of at least two load-guided parallel oscillating circuit inverters being supplied from a common source which is controlled by an open-loop/closed-loop control and being connected in series on the DC side, each inverter having one induction furnace with a compensating capacitor, which includes igniting two diagonally opposed current converter valves at a time in one inverter to establish a flow of current from the source with a series-connected choke through the parallel oscillating circuit connected to that inverter, the improvement which comprises:

adjusting load phase angles of the parallel oscillating circuit inverters, resulting in specified individual powers of the parallel oscillating circuits wherein a maximum power that can be output by the source is taken into account, and attaining a specified ratio between the individual powers of the parallel oscillating circuits, and intervening into the open-loop/closed-loop control of the source only after one of the load phase angles to be established reaches a minimum value defined with valve hold-off intervals, while operating the source in fully driven fashion at load phase angles to be established above the minimum value, supplying the inverters from a direct voltage source with a series-connected choke, and reducing the direct voltage when intervening into the open-loop/closed-loop control, determining a varied current as an auxiliary variable while taking both the varied powers to be established and the voltage into account; ascertaining a varied impedance of each parallel oscillating circuit from the varied oscillating circuit current and the varied oscillating circuit power to be established; and determining the load phase angles from the ascertained varied impedances.

* * * * *